United States Patent Office  3,131,989
Patented May 5, 1964

3,131,989
PROCESS FOR DYEING WOOL WITH 1:2-METAL COMPLEX DYES CONTAINING A SINGLE SULFONIC ACID GROUP
Arthur Buehler, Rheinfelden, and Richard Casty, Kaiseraugst, Switzerland, and Gerhard Back, Lorrach, Germany, assignors to Ciba Limited, Basel, Switzerland, a company of Switzerland
No Drawing. Filed Jan. 31, 1961, Ser. No. 86,000
Claims priority, application Switzerland Feb. 2, 1960
5 Claims. (Cl. 8—43)

It has been found that wool or mixtures of wool with other fibers which contain or are free from nitrogen can be dyed in an advantageous manner with dyestuffs consisting substantially of 1:2-chromium or 1:2-cobalt complex compounds of azo dyes, the molecule of the metal complex containing a single acid group imparting solubility in water, in the presence of compounds that contain at least one basic nitrogen atom to which is bound at least one radical containing a polyglycol ether chain, the molecule containing at least three

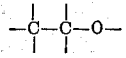

groups and at least four carbon atoms not forming part of such a group, and in the presence of an anionic compound that has no dyestuff character but possesses affinity for wool.

The dyestuffs to be used in the present process are 1:2-chromium or 1:2-cobalt complexes of azo dyestuffs, more especially monoazo dyestuffs, that is to say complexes in which one molecule each of two different azo dyestuffs, of which one contains a single group imparting solubility in water while the other contains no such group, is bound in complex union to one atom of chromium or cobalt. The complex may contain, for example, a disazo dye and a monoazo dyestuff or preferably two monoazo dyestuff molecules. For the present purpose groups imparting solubility in water are free carboxylic acid groups (—COO cation) or more especially free sulfonic acid groups (—SO₃ cation), for which purpose carboxylic acid groups participating in the formation of the complex are not counted as groups imparting solubility in water because when bound in this fashion they no longer produce solubility in water. Furthermore, sulfonic acid amide groups and alkylsulfone groups are not counted as groups imparting solubility in water in this connection although, as is known, these groups are capable of improving the solubility in water of this type of complex. Accordingly, the present process does not extend to complexes that contain only substituents of this type but no carboxylic acid groups or sulfonic acid groups, but it does cover those which contain one of the aforementioned substituents in addition to a single sulfonic acid group or solubilizing carboxylic acid group.

The metal complex forming group present in the azo dyestuff may be, for example, an ortho:ortho'-dihydroxyazo grouping or an ortho-hydroxy-ortho'-carboxyazo grouping; other complex-forming groups such as ortho-hydroxy-ortho'-carboxy-methoxy or ortho-hydroxy-ortho'-aminoazo groupings are likewise possible.

A number of dyestuffs suitable for use in the present process as well as methods for their manufacture are known.

For example, it is of advantage to form the 1:1-metal complex of one of the two dyestuffs from which the asymmetrical 1:2-complex is to be synthesized, preferably the one which contains the solubilizing group, and the resulting complex is then reacted with the other, metal-free dyestuff. In this connection it should also be mentioned that the complexes of ortho:ortho'-dihydroxyazo dyestuffs can be prepared not only from the ortho:ortho'-dihydroxyazo dyestuffs themselves but also from the corresponding ortho-hydroxy-ortho'-alkoxy azo dyestuffs.

Alternatively, the asymmetrical 1:2-complexes can be prepared by treating a mixture of equimolecular proportions of the two dyestuffs required with a suitable metal donor such as alkali metal chromosalicylate or cobalt sulfate.

The aforementioned nitrogenous compounds contain at least one basic nitrogen atom to which is bound at least one radical containing a glycol ether chain. This chain consists of at least two

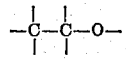

members and may be bound to the nitrogen atom directly or through a bridge member, for example through an alkylene radicals such as the radical $$-CH_2-CH_2-CH_2-$$

The molecule of the nitrogen compound should contain at least three

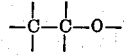

groups, preferably $$-CH_2-CH_2-O-$$

groups.

Furthermore, the nitrogen compound must contain at least four carbon atoms not belonging to such a group; advantageously, it may further contain at least one aliphatic or alicyclic radical containing at least 8 interconnected carbon atoms, preferably an aliphatic radical containing at least 12 interconnected carbon atoms, furthermore an aromatic radical which contains an aliphatic side chain and is bound to the basic nitrogen atom through an aryl carbon atom.

From the foregoing it will be realized that in the present process there is advantageously used as nitrogenous compound of the specified kind a reaction product of at least three molecular proportions of an $\alpha:\beta$-alkylene oxide with one molecular proportion of an organic compound containing at least one basic primary or secondary amino group or a basic tertiary amino group and in addition thereto an alcoholic hydroxyl group, or a salt or quaternary ammonium salt derived from such reaction product.

Products suitable for use in the present process are those which are obtained by reacting one mol of an amine with at least three, for example 3 to 20, mols of an alkylene oxide, for example the reaction products of 1 mol of dodecylamine with about 6 mols of ethylene oxide,
1 mol of oleylamine with 6, 8 or 16 mols of ethylene oxide,
1 mol of octadecenylamine with 4, 8 or 16 mols of ethylene oxide,
Monoalkyl propylenediamine whose alkyl radical corresponds to the radical of tallow fatty acids, with 8 mols of ethylene oxide,
Monoalkyl propylenediamine whose alkyl radical is unbranched and contains 16 to 18 carbon atoms, with 6 mols of ethylene oxide.

From the foregoing it will be realized that nitrogen compounds of the formula (I)

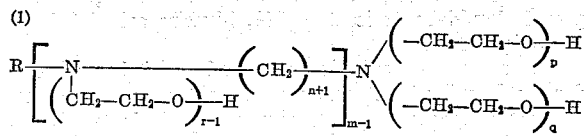

are particularly suitable for use in the present process. In this formula R represents a preferably unbranched aliphatic hydrocarbon radical containing at least 12, preferably 16 to 22, carbon atoms; $m$ and $n$ each $=1$ or 2; $p$, $q$ and $r$ are whole numbers, the sum $p+q+(m-1)(r-1)$ being at least 3 and at most 20, and at least one of the values $p$, $q$ and $(m-1)$ being greater than 1.

It will be further realized that nitrogen compounds of the formula

2) 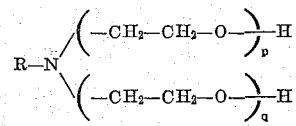

are particularly suitable for use in the present process, in which formula R represents a preferably unbranched aliphatic hydrocarbon radical with at least 12, preferably 16 to 22, carbon atoms, and $p$ and $q$ are whole numbers, the sum $(p+q)$ being at least 3 and preferably a number from 8 to 16.

Instead of a compound containing free hydroxyalkyl groups there may be used as assistants in the present dyeing process the acid esters of polybasic acids, for example of phosphoric or sulfuric acid, derived from said hydroxyalkyl compounds, or the water-soluble salts of said esters, for example alkali metal salts or salts of ammonia or amines.

Dyeing according to the present invention is carried out in the presence of an anionic compound that has no dyestuff character but possesses affinity for the nitrogenous fibers. It is of advantage to use a compound containing sulfonic acid groups, the sulfonic acid groups being advantageously bound to aromatic nuclei, for example benzene nuclei or more especially naphthalene nuclei.

As examples of suitable compounds there may be mentioned:

Alkali metal sulfonates of benzene hydrocarbons having a relatively long aliphatic chain, Alkali metal monosulfonates of 2-alkylbenzimidazoles containing a higher alkyl radical, for example the sodium salts of monosulfonated 2-heptadecyl-N-methylbenzimidazole, Alkali metal sulfonates of naphthalene substituted by lower alkyl groups, for example sodium diisobutyl naphthalene-sulfonate, Sulfonated condensation products of hydroxyaryl compounds of the benzene series with formaldehyde, more especially such as are obtained by condensing a hydroxyaryl compound of the benzene series with formaldehyde, followed by sulfonation and another condensation of the sulfonation product with formaldehyde;

Particularly useful results are obtained with reaction products of naphthalenesulfonic acids with formaldehyde.

Furthermore there may also be used compounds that have affinity for the fiber and are of a different type, for example fiber-affinitive, sulfonated anti-moth preparations or so-called wool immunizing agents of the type obtained by reacting a phenol or thiophenol with an alkali metal sulfide, alkali metal sulfite or sulfite formaldehyde.

The proportions of substances to be added to the dyebath in the present process may vary within relatively wide limits. The amount of dyestuff depends, of course, on the desired depth of shade. It is of advantage to adapt the proportion of the nitrogenous compound to that of the dyestuff in a manner such as to give a ratio of about 1:8 to 1:2, and it is of advantage to add an amount of nitrogen compound equal to about ¼ of the amount of dyestuff used. However, even in the case of pale shades for which less than 1% of dyestuff calculated on the weight of the fiber is used, the amount of nitrogen compound should be at least 0.25%, likewise calculated on the weight of the fiber.

The amount of anionic compound which has affinity for the fiber is advantageously the greater the smaller the amount of dyestuff used. For very pale shades produced with 0.1% or even less of dyestuff and about 0.5% of nitrogenous compound it may be of advantage to use, for example, about 0.3 to 1% of the anionic compound.

Furthermore it is found advantageous to dye in a weakly acidic medium, the pH value of the dyebath ranging from about 3 to 6 and preferably 4 to 5. This pH value can advantageously be adjusted by adding acetic acid, or if desired formic or sulfuric acid. It is also possible to add sodium sulfate to the dyebath. In some cases it is advantageous to establish the desired acidity of the dyebath by adding an ammonium salt capable of giving off acid, for example ammonium sulfate, phosphate or acetate.

As is generally practised in dyeing wool, the present process is carried out at an elevated temperature, advantageously starting the actual dyeing process at about 50 to 80° C., raising the whole to the boil and then continuing and completing the dyeing at the boil. However, it has been observed that when dyeing wool according to the present process it is not at all necessary to raise the temperature very closely or fully to the boil of the dyebath; as a rule, substantially equally good results are obtained by carrying out the dyeing well below the boil, for example at a temperature ranging from 80 to 90° C. Furthermore, it has been surprisingly observed that it is of advantage to pretreat the fiber material to be dyed, more especially the wool, in a bath containing all ingredients except the dyestuff, that is to say the nitrogenous polyglycol compound, the fiber-affinitive anionic compound and the acid or an ammonium salt. In this bath the textile material is pretreated at a temperature ranging from 80 to 100° C. for 5 to 30 minutes. Then generally without cooling—the dyestuff is added in the form of an aqueous solution and dyeing is performed between 80 and 100° C. until the dyebath is substantially exhausted.

When the pH value of the acid bath is increased after the dyestuff has been absorbed, the wet fastness properties of the dyeing, insofar as bleeding out is concerned, can be further improved.

Instead of adding the nitrogenous polyglycol compound and the fiber-affinitive anionic compound to the dyebath singly, there may be used preparations containing suitable proportions of the two compounds.

Unless otherwise indicated parts and percentages in the following examples are by weight.

*Example 1*

100 parts of knitting wool are introduced in a dyebath containing in 3000 parts of water 10 parts of crystalline sodium sulfate, 3 parts of acetic acid of 40% strength, 0.5 part of an adduct of about 8 mols of ethylene oxide with 1 mol of octadecenylamine, 0.4 part of a condensation product of naphthalenesulfonic acid with formaldehyde, and 0.2 part of the chromium complex containing 1 molecular proportion each of the two azo dyestuffs of the formulae

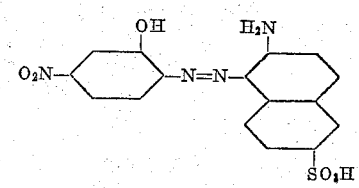

and

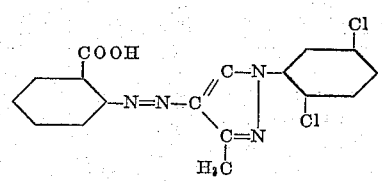

bound in complex union to 1 atomic proportion of chromium.

In the course of ½ hour the dyebath is raised to the boil and the wool is dyed for one hour at the boil, then rinsed and dried. A level green dyeing results.

*Example 2*

The process described in Example 1 is used except that instead of the chromiferous dyestuff mentioned in Example 1 one of the undermentioned 1:2-metal complexes is used which can be prepared in the conventional manner and which likewise produce level dyeings.

The amount of assistant to be added depends on the desired tinctorial strength; it should be at least 0.25% of the ethylene oxide adduct, being in the case of pale dyeings up to 1%, in the case of dark dyeings at least 0.2% of the reaction product of naphthalenesulfonic acid with formaldehyde.

| No. | Metal | Dyestuff with solubilizing group | Dyestuff without solubilizing group | Shade |
|---|---|---|---|---|
| 1 | Cr | [structure] | [structure] | Brown. |
| 2 | Cr | [structure] | [structure] | Do. |
| 3 | Cr | [structure] | [structure] | Red. |
| 4 | Cr | [structure] | [structure] | Blue. |
| 5 | Cr | [structure] | [structure] | Brown. |
| 6 | Cr | [structure] | [structure] | Green. |
| 7 | Cr | [structure] | [structure] | Blue. |
| 8 | Cr | [structure] | [structure] | Grey. |
| 9 | Cr | [structure] | [structure] | Do. |

| No. | Metal | Dyestuff with solubilizing group | Dyestuff without solubilizing group | Shade |
|---|---|---|---|---|
| 10 | Cr | $O_2N$–C$_6$H$_3$(OH)–N=N–naphthalene(NH$_2$)(SO$_3$H) | C$_6$H$_3$(OH)(Cl)–N=N–naphthol | Grey. |
| 11 | Cr | (HO$_3$S)(Cl)C$_6$H$_3$(OH)–N=N–naphthol(Cl)$_2$ | (Cl)$_2$C$_6$H$_3$(OH)–N=N–naphthol(Cl)$_2$ | Blue. |
| 12 | Co | HO$_3$S–C$_6$H$_3$(OH) (naphthyl)–N=N–naphthol | $O_2N$–C$_6$H$_3$(OH)–N=N–naphthol(Cl)$_2$ | Violet. |
| 13 | Co | HO$_3$S–C$_6$H$_3$(OH) (naphthyl)–N=N–naphthol | $O_2N$–C$_6$H$_3$(OH)–N=N–C(pyrazolone with phenyl, CH$_3$) | Red-brown. |
| 14 | Cr | C$_6$H$_3$(OH)(SO$_2$–NH–C$_6$H$_4$–COOH)–N=N–C(pyrazolone, phenyl, CH$_3$) | $H_2N$–SO$_2$–C$_6$H$_4$–OH–N=N–naphthol | Claret. |
| 15 | Cr | ($H_2N$–SO$_2$)C$_6$H$_3$(OH)–N=N–naphthol(COOH) | $O_2N$–C$_6$H$_3$(OH)–N=N–naphthol | Bluish grey. |
| 16 | Cr | (HO$_3$S)C$_6$H$_3$(CH$_3$)–N=N–C$_6$H$_3$(OH)–N=N–naphthol | $O_2N$–C$_6$H$_3$(OH)–N=N–C(pyrazolone, phenyl, CH$_3$) | Greyish brown. |

*Example 3*

100 parts of a woollen fabric are introduced in a dyebath containing in 3000 parts of water 5 parts of ammonium phosphate, 0.6 part of the adduct of octadecenylamine and ethylene oxide described in Example 1, as well as 0.4 part of a condensation product of naphthalenesulfonic acid with formaldehyde. Within a short period the dyebath is raised to the boil and maintained at the boil for 15 to 20 minutes. Thereupon an aqueous solution of 2 parts of one of the dyestuffs described in Examples 1 and 2 is added to the boiling dyebath, and dyeing at the boil is performed for one hour. Fast, level dyeings are thus obtained.

*Example 4*

The procedure described in Example 1 or 2 is used except that the temperature is raised only to 85° C. instead of the boil. Level dyeings are thus likewise obtained.

*Example 5*

A dyebath is prepared from 3000 parts of water, 10 parts of crystalline sodium sulfate, 6 parts of acetic acid of 40% strength, 0.5 part of one of the undermentioned ethylene oxide adducts (a) to (g), 0.4 part of a condensation product of naphthalenesulfonic acid with formaldehyde, and 0.2 part of one of the dyestuffs used in Examples 1 and 2. 100 parts of knitting wool are immersed at 50° C. in the dyebath so prepared which is then raised in the course of ½ hour to the boil and the yarn is dyed for one hour at the boil, then rinsed and dried. Level dyeings are obtained.

(a) Adduct of 8 mols of ethylene oxide with a mixture of arachidylamine and behenylamine.
(b) Adduct of 12 mols of ethylene oxide with a mixture of arachidylamine and behenylamine.
(c) Adduct of 4 mols of ethylene oxide with octadecylamine.
(d) Adduct of 20 mols of ethylene oxide with a mixture of arachidylamine and behenylamine.
(e) Adduct of 8 mols of ethylene oxide with a mixture consisting of 30% of palmitylamine, 45% of octadecenylamine and 25% of octadecylamine.
(f) Adduct of 6 mols of ethylene oxide with a mixture of N-alkyl-propylenediamines whose alkyl radicals contain 16 to 18 carbon atoms.

(g) Adduct of 8 mols of ethylene oxide with a mixture of N-alkyl-propylenediamines whose alkyl radicals contain 16 to 18 carbon atoms.

*Example 6*

The process described in Example 1 or 2 is performed but there is added to the dyebath instead of the condensation product of naphthalenesulfonic acid with formaldehyde a product obtained by condensing a mixture of 2 mols of phenol and 1 mol of para-dodecylphenol with 1.75 mols of formaldehyde, sulfonating the resulting reaction product, subjecting the sulfonic acid to further condensation with formaldehyde and neutralizing with ammonia. Level dyeings are obtained.

Instead of the assistant prepared from phenol and paradodecylphenol there may be used products obtained in identical manner from 2 mols of phenol and 1 mol of para-cresol or para-octylphenol.

What is claimed is:

1. A process for dyeing wool with 1:2-chromium complexes of azo dyestuffs which contain in the molecule of the metal complex one sulfonic acid group imparting solubility in water which process comprises dyeing wool in the presence of a compound containing a basic nitrogen atom which corresponds to the formula

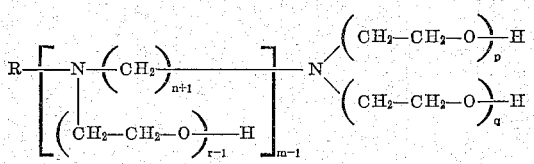

wherein R represents an unbranched aliphatic hydrocarbon radical containing from 12 to 22 carbon atoms; $m$ and $n$ are the whole numbers 1 and 2, and $p$, $q$ and $r$ are whole numbers, the sum $p+q+(n-1)(r-1)$ being at least 3 and at the most 20, at least one of the values $p$, $q$ and $(r-1)$ being greater than 1 and in the presence of a sulfonated condensation product of a hydroxyaryl compound of the benzene series with formaldehyde.

2. A process for dyeing wool with 1:2-chromium complexes of azo dyestuffs which contain in the molecule of the metal complex one sulfonic acid group imparting solubility in water which process comprises dyeing wool in the presence of a compound containing a basic nitrogen atom which corresponds to the formula

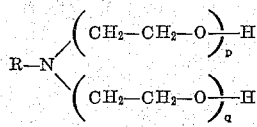

wherein R represents an unbranched aliphatic hydrocarbon and $p$ and $q$ are whole numbers, the sum $(p+q)$ being at least 3 and at the most 20 and in the presence of a sulfonated condensation product of a hydroxyaryl compound of the benzene series with formaldehyde.

3. A process for dyeing wool with 1:2-chromium complexes of azo dyestuffs which contain in the molecule of the metal complex one sulfonic acid group imparting solubility in water which process comprises dyeing wool in the presence of a compound containing a basic nitrogen atom which corresponds to the formula

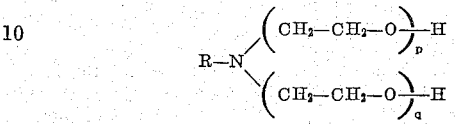

wherein R represents an unbranched aliphatic hydrocarbon and $p$ and $q$ are whole numbers, the sum $(p+q)$ being at least 3 and at the most 20 and in the presence of a condensation product of naphthalenesulfonic acid with formaldehyde.

4. A process for dyeing wool with 1:2-chromium complexes of azo dyestuffs which contain in the molecule of the metal complex one sulfonic acid group imparting solubility in water which process comprises dyeing wool in the presence of an adduct of about 8 mols of ethylene oxide with 1 mol of octadecenylamine and a condensation product of naphthalenesulfonic acid with formaldehyde.

5. A process for dyeing wool with 1:2-chromium complexes of azo dyestuffs which contain in the molecule of the metal complex one sulfonic acid group imparting solubility in water which process comprises dyeing wool in the presence of an adduct of about 8 mols of ethylene oxide with 1 mol of octadecenylamine and an anionic compound obtained by condensing a mixture of 2 mols of phenol and 1 mol of para-dodecylphenol with 1.75 mols of formaldehyde, sulfonating the resulting reaction product, subjecting the sulfonic acid to further condensation with formaldehyde and neutralizing with ammonia.

References Cited in the file of this patent

UNITED STATES PATENTS

| | | |
|---|---|---|
| 2,179,371 | Dyer | Nov. 7, 1939 |
| 2,310,074 | Gotte | Feb. 2, 1943 |
| 2,760,841 | Salvin et al. | Aug. 28, 1956 |
| 2,763,530 | Schuetz et al. | Sept. 18, 1956 |
| 2,852,331 | Youse | Sept. 16, 1958 |
| 2,890,094 | Tucker | June 9, 1959 |
| 2,963,513 | Albrecht | Dec. 6, 1960 |
| 3,041,327 | Buehler et al. | June 26, 1962 |
| 3,056,644 | Radley et al. | Oct. 2, 1962 |

OTHER REFERENCES

Sisley: American Dyestuff Reporter, July 11, 1949, pp. 513–521.

Goldsmith: Chemical Industries, March 1943, pp. 326–328, particularly page 327.